US012452094B2

(12) United States Patent
Mayfield et al.

(10) Patent No.: US 12,452,094 B2
(45) Date of Patent: Oct. 21, 2025

(54) PERSISTENT HYBRID VIRTUAL COLLABORATIVE WORKSPACES

(71) Applicant: Zoom Video Communications, Inc., San Jose, CA (US)

(72) Inventors: Ross Douglas Mayfield, Palo Alto, CA (US); Robert Allen Ryskamp, Mountainview, CA (US); Jeffrey William Smith, Layton, UT (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 17/733,585

(22) Filed: Apr. 29, 2022

(65) Prior Publication Data

US 2023/0353404 A1 Nov. 2, 2023

(51) Int. Cl.
*H04L 12/18* (2006.01)
*H04L 65/401* (2022.01)
*H04L 65/403* (2022.01)

(52) U.S. Cl.
CPC ...... *H04L 12/1822* (2013.01); *H04L 12/1818* (2013.01); *H04L 65/401* (2022.05); *H04L 65/403* (2013.01)

(58) Field of Classification Search
CPC ......... H04L 12/00; H04L 12/02; H04L 12/16; H04L 12/18; H04L 12/1813–1831; H04L 65/00; H04L 65/40; H04L 65/401; H04L 65/403
See application file for complete search history.

(56) References Cited

U.S. PATENT DOCUMENTS

| | | | | |
|---|---|---|---|---|
| 5,999,208 | A * | 12/1999 | McNerney | H04N 7/15 348/E7.083 |
| 8,514,842 | B1 * | 8/2013 | Jared | H04L 12/1822 709/248 |
| 9,900,280 | B2 | 2/2018 | Geppert et al. | |
| 10,542,238 | B2 * | 1/2020 | Bergmann | G06T 15/08 |
| 11,562,657 | B1 | 1/2023 | Fieldman | |
| 11,563,710 | B1 * | 1/2023 | MacDonald | H04L 67/146 |
| 11,588,657 | B2 | 2/2023 | Rolin et al. | |
| 12,237,936 | B2 | 2/2025 | Mayfield et al. | |
| 2004/0117446 | A1 * | 6/2004 | Swanson | H04L 65/4038 709/205 |
| 2007/0208806 | A1 * | 9/2007 | Mordecai | G06Q 10/10 709/204 |
| 2008/0263459 | A1 * | 10/2008 | Altberg | H04L 51/046 715/757 |

(Continued)

OTHER PUBLICATIONS

U.S. Appl. No. 17/733,410; Non-Final Office Action dated Mar. 3, 2023, 20 pages.

(Continued)

*Primary Examiner* — Boris D Grijalva Lobos
(74) *Attorney, Agent, or Firm* — Kilpatrick Townsend & Stockton LLP

(57) ABSTRACT

One example method includes generating, by a conference provider, a virtual space; adding a plurality of members to the virtual space; adding one or more resources to the virtual space in response to one or more inputs from one or more of the members; initiating, by the conference provider, a conference between two or more of the members; attaching the conference to the virtual space; and providing an indication of the conference in the virtual space.

20 Claims, 10 Drawing Sheets

(56) References Cited

U.S. PATENT DOCUMENTS

| | | | |
|---|---|---|---|
| 2014/0033067 A1* | 1/2014 | Pittenger | G06F 21/606 |
| | | | 709/205 |
| 2016/0073056 A1 | 3/2016 | Katzman et al. | |
| 2017/0195266 A1 | 7/2017 | Moyers | |
| 2017/0257598 A1 | 9/2017 | Reshef et al. | |
| 2018/0123814 A1 | 5/2018 | Sexauer et al. | |
| 2018/0123815 A1 | 5/2018 | Milvaney et al. | |
| 2019/0268387 A1 | 8/2019 | Pelton et al. | |
| 2021/0105149 A1 | 4/2021 | Roedel et al. | |
| 2021/0185105 A1 | 6/2021 | Van Wie et al. | |
| 2022/0021680 A1 | 1/2022 | Roedel et al. | |
| 2022/0141265 A1* | 5/2022 | Leland | G06F 3/165 |
| | | | 709/204 |
| 2022/0303152 A1 | 9/2022 | Norton, Jr. et al. | |
| 2022/0321369 A1* | 10/2022 | Lin | H04L 12/1822 |
| 2022/0321370 A1* | 10/2022 | Skuratowicz | H04L 12/1822 |
| 2022/0321372 A1 | 10/2022 | Cho et al. | |
| 2022/0321617 A1 | 10/2022 | Gale et al. | |
| 2022/0321833 A1 | 10/2022 | Lin et al. | |
| 2022/0400139 A1* | 12/2022 | Walling | H04L 65/403 |
| 2023/0008964 A1 | 1/2023 | Fernandez Guajardo et al. | |
| 2023/0045116 A1 | 2/2023 | Pitts et al. | |
| 2023/0156156 A1* | 5/2023 | Zhang | H04L 12/1818 |
| | | | 709/204 |
| 2023/0353402 A1 | 11/2023 | Mayfield | |
| 2023/0353404 A1 | 11/2023 | Mayfield et al. | |

OTHER PUBLICATIONS

U.S. Appl. No. 17/733,410; Final Office Action dated Aug. 1, 2023, 23 pages.

EP International Search Report and Written Opinion for PCT/US2023/017513 mailed Aug. 11, 2023.

U.S. Appl. No. 17/733,410 , "Non-Final Office Action", Jan. 24, 2024, 26 pages.

U.S. Appl. No. 17/733,410 , "Notice of Allowance", May 22, 2024, 9 pages.

U.S. Appl. No. 17/733,410 , "Notice of Allowance", Jun. 28, 2024, 8 pages.

U.S. Appl. No. 17/733,410 , "Notice of Allowance", Oct. 29, 2024, 8 pages.

* cited by examiner

US 12,452,094 B2

PERSISTENT HYBRID VIRTUAL COLLABORATIVE WORKSPACES

FIELD

The present application generally relates to virtual workspaces and more generally relates to persistent hybrid virtual collaborative workspaces.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
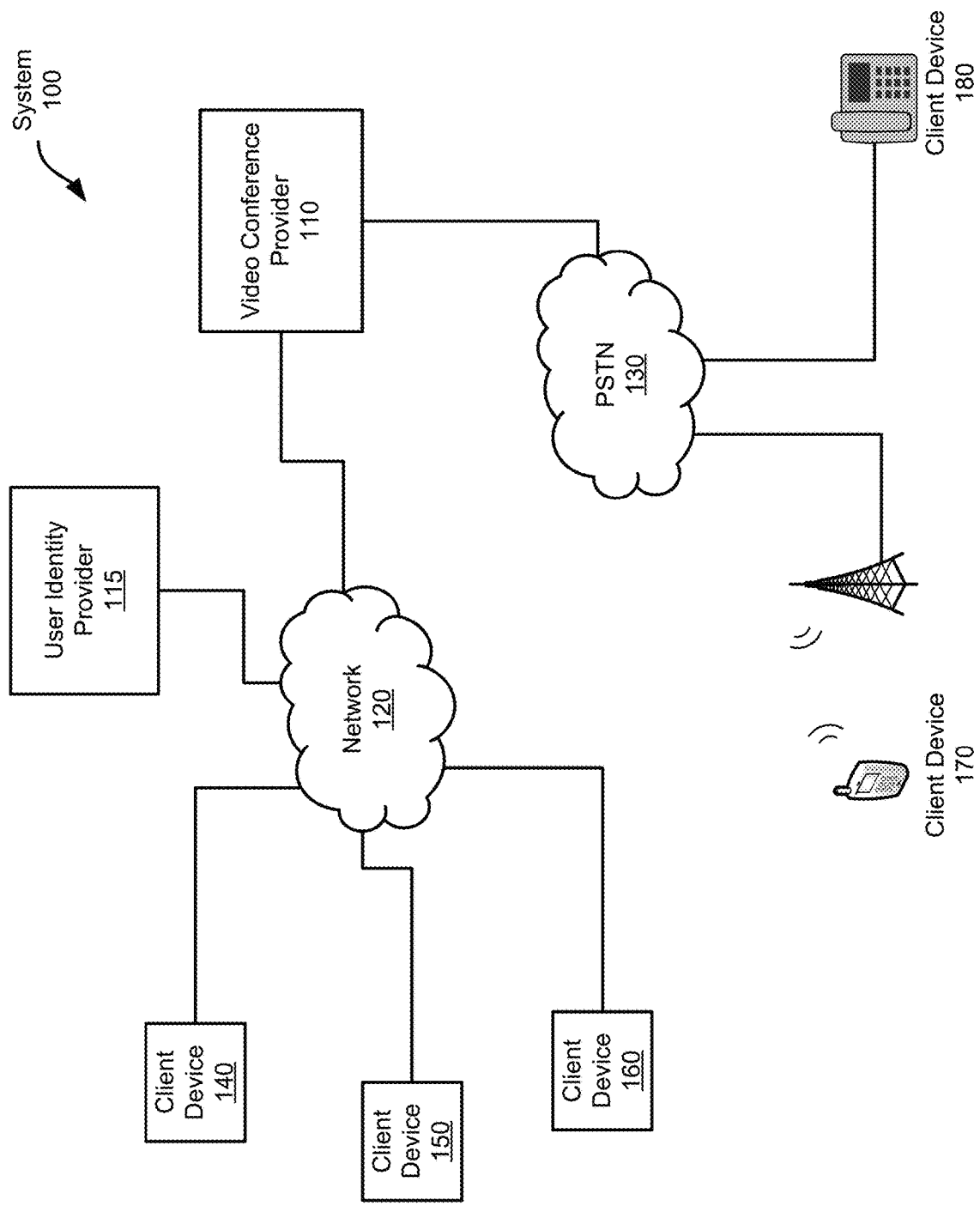
FIGS. 1-3 show example systems for providing persistent hybrid virtual collaborative workspaces.

Examples are described herein in the context of persistent hybrid virtual collaborative workspaces. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

While working on a project or with a team, people may engage in various types of interactions, such as meetings with other team members and generating or revising documents. In a physical office setting, these may be accomplished by in-person interactions, such as in a conference room or by visiting a team members office or work area. However, in settings where team members are remote from each other or may be working from home or other non-office locations, in-person interactions may be impractical. Thus, virtual replacements may be used, such as video conferences or emailing documents amongst team members. However, the sense of collaboration or membership on a team may be diminished when team members are not able to interact in person. In addition, the team's ability to organize itself may be affected since working remotely distributes information and knowledge across different physical locations without a centralized location for the team to collaborate.

To help address these issues, a video conference provider may provide functionality to allow a team to create a virtual "space" within which the team can work and interact. For example, documents, notes, chats, and meetings may be held within the space. Further, each of these may be accessible to the other members of the space at any time, subject to any access restrictions that may be imposed. As team members perform their various tasks, they may "enter" the space to access documents or other materials. While they are "within" the space, they may be able to determine who else is present within the space and, if they would like, they can start an interaction with another team member, such as by starting an impromptu meeting with the other team member or by entering a chat message. In addition, the team member may see what other meetings may be occurring and between whom. They can then join or listen in to an on-going meeting if it looks to be of interest.

In addition, the virtual space can be attached to a physical location, such as a conference room that is equipped with video conferencing equipment. People within the conference room can connect to the space and physically work in the conference room with the resources available within the space. In addition, they can engage in video conferences with other members of the space, either via a scheduled video conference or through an impromptu meeting with one or more other team members. Or they can join an on-going meeting that's visible within the space, even without an invitation. Depending on the nature of the space and the conference room, the connection between the two may be persistently maintained so that when people are working within the conference room, other team members within the space can see that there is activity in the conference room and virtually "join" the conference room via a video conference.

Over time, as the team interacts with each other or adds or modifies content within the space, the space tracks the interactions and can store those interactions within the space for later review. For example, when team members engage in a meeting within the space, the space may record the meeting and store the recording within the space, or it may generate a transcript of the meeting and store the transcript within the space. Similarly, the space may archive chat messages over time, such as after a week, and allow team members to access old chats to review what was discussed. Thus, the space provides not only a repository for the team's resources and work product, but also an interaction space within which the team members can interact more like they are physically present within the same location. The space also serves as an archivist that monitors and records communications and other interactions that may occur within the space. Thus, the space provides a centralized "location" where team interactions and work can take place, despite team members being geographically distant from each other.

This illustrative example is given to introduce the reader to the general subject matter discussed herein and the disclosure is not limited to this example. The following sections describe various additional non-limiting examples and examples of persistent hybrid virtual collaborative workspaces.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
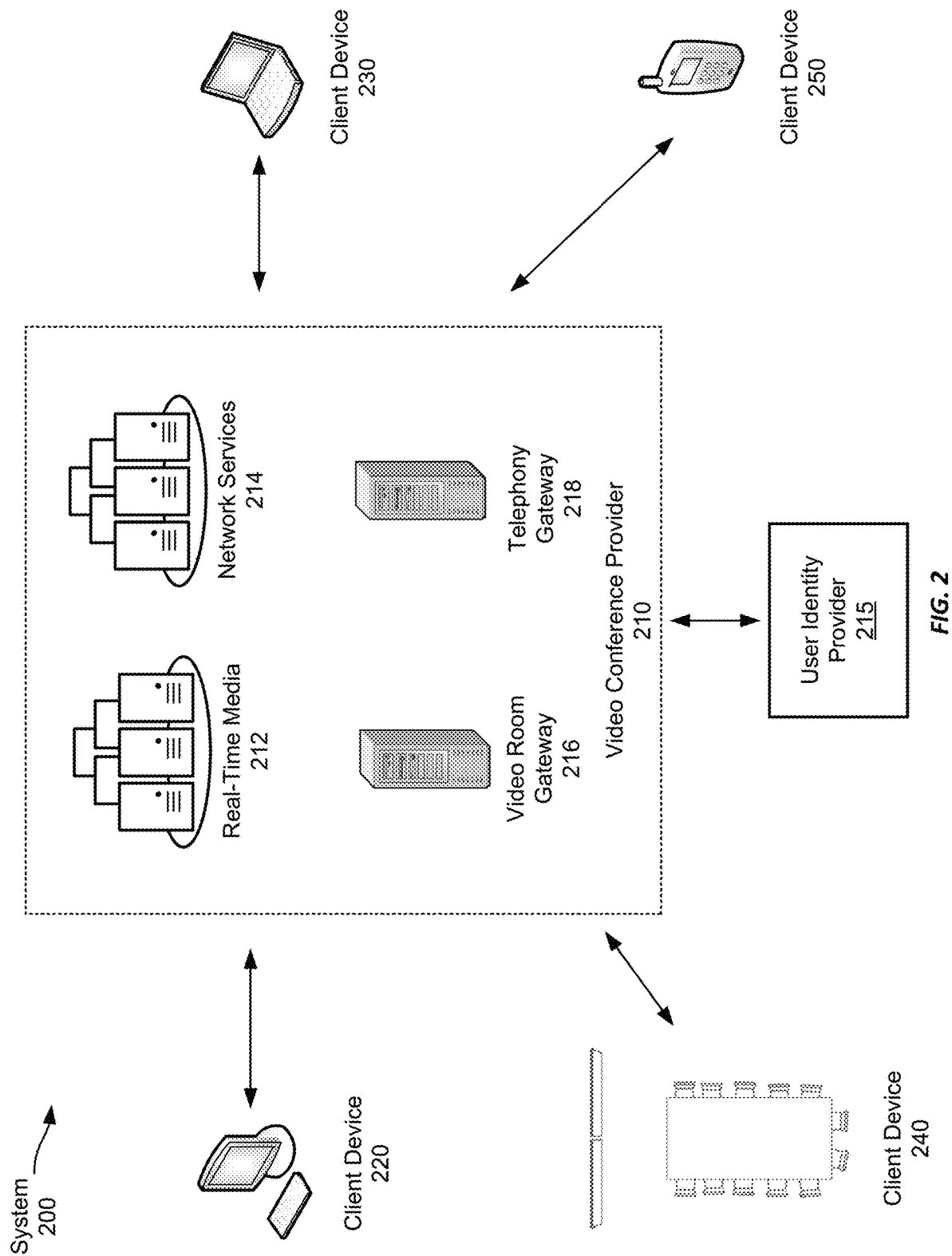

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
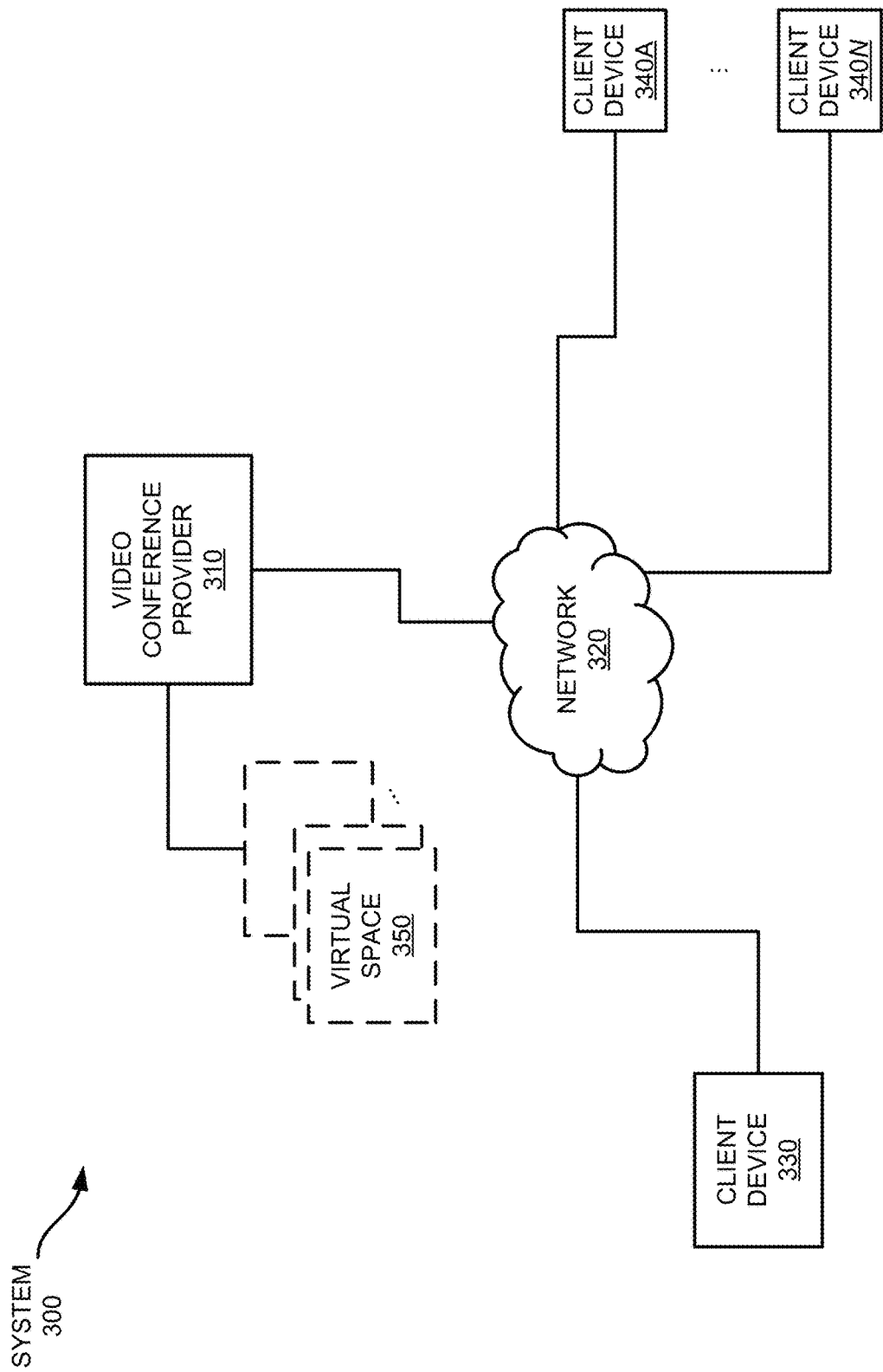

Referring now to FIG. 3, FIG. 3 shows an example system 300 for providing one or more persistent hybrid virtual collaborative workspaces. The system 300 shown in FIG. 3 includes a video conference provider 310 that has established and maintains multiple virtual spaces 350. The system 300 also includes multiple client device 330, 340*a-n* that are connected to the video conference provider 310 via a network 320. In this example, the network 320 is the internet; however, any communications network or combination of communications networks may be employed. And while the system 300 is depicted as including multiple client devices 330, 340*a-n*, it should be appreciated that some example systems may not include any client devices at any particular time. Rather, the video conference provider 310, which establishes and maintains virtual spaces 350 may be sufficient as a system for persistent hybrid virtual collaborative workspaces, to which one or more client devices 330, 340*a-n* may connect.

The video conference provider 310 establishes new spaces 350 at the request of corresponding users and stores one or more records in a database to represent the configuration and state of each space 350. For example, when a space is first established, it may not have any resources or members, other than the user who requested that the space be created. However, as documents, other users, meetings, or other content are added to or created within the space, the video conference provider 310 may add links or references to those resources or users. Thus, in some examples, the various resources may not be stored within the database or even stored by the video conference provider 310. Instead, the space provides a nexus through which such resources may be accessed, such as by traversing a universal resource locator ("URL"), by accessing a document within a document management system or stored in a local networked storage area. However, it should be appreciated that some examples may store individual resources as records within the database along with the configuration and state of the space itself.

Each of the spaces 350 established and maintained by the video conference provider 310 allows members of the respective space to connect to the space, interact with resources available within the space, and interact with other users that are connected to the space. However, each of the spaces 350 persists independently of whether any users are connected to the space or resources are available within the space. Thus, the space remains latent and available for use by any member of the space at any time.

Figure 4:
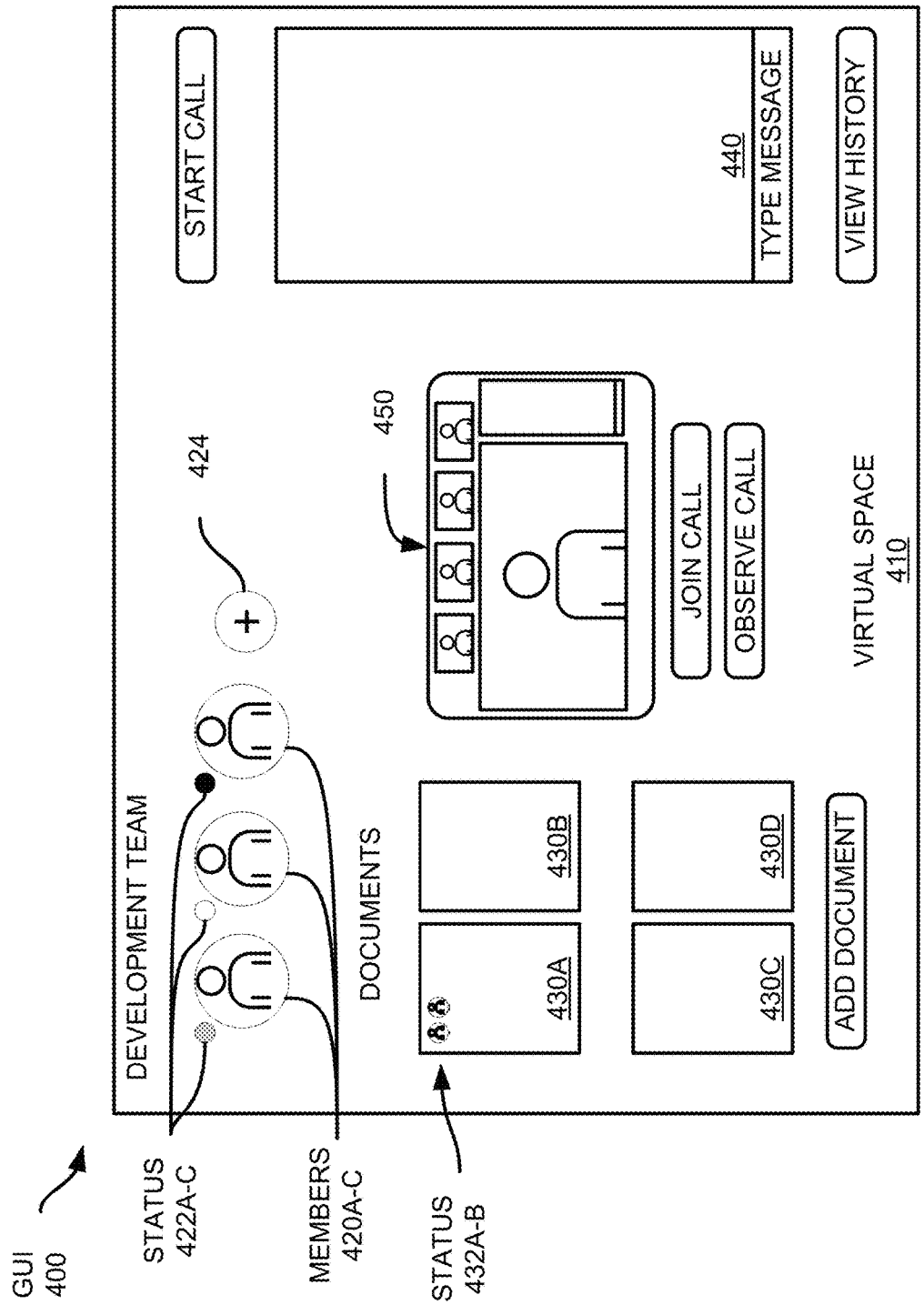
FIGS. 4-6 show example graphical user interfaces ("GUIs") for persistent hybrid virtual collaborative workspaces.

Referring now to FIG. 4, FIG. 4 shows a graphical user interface ("GUI") 400 view of a virtual space 410 provided by the video conference provider 310. The virtual space 410 in this example has multiple team members 420a-c that have been added to the virtual space 410. In addition, the GUI 400 provides an option 424 to add additional users to the virtual space 410. The virtual space 410 has also been updated to include four documents 430a-d, which may be accessed by members of the virtual space 410. The virtual space 410 has also been configured to allow members 420a-c to add documents to the virtual space, such as by using the "Add Document" option or dragging a document onto the virtual space 410 within the GUI 400, and to create and participate in video conferences within the space by using the "Start Call" option. Similarly, when a video conference is in-progress within the virtual space 410, the GUI 400 provides a representation of the video conference 450. This allows members 420a-c of the space to see that a video conference is in-progress and who is within the video conference. The GUI 400 also provides the option to join the call via the "Join Call" button or to observe the call via the "Observe Call" button. The virtual space 410 has also been configured with chat functionality 440 to allow the members 440a-c to interact via text chat. Further, the virtual space 410 provides a "View History" option to allow the members 420a-c to view past events within the space, such as recordings of past video conferences, chat interactions, when team members have joined or left the space, or other events of interest.

In addition to providing access to the resources discussed above, the virtual space 410 can also provide status information to assist team members in understanding the current state of the virtual space. For example, as discussed above, the GUI 400 representation of the virtual space 410 provides a status indication that a video conference 450 is in-progress. In this example, the GUI 400 provides a static, stylized representation of a video conference, but the representation does not actually provide any content from the video conference. Instead, a team member 420a-c would need to join the video conference to obtain audio or video feeds or other information shared within the conference. However, in some examples the representation 450 may show the content of the video conference. Thus, the members 420a-c may be able to see the video feeds within the representation of the video conference 450 or, by selecting an option, may be able to hear the audio from the video conference without actually joining the video conference. When a member 420a-c is observing a video conference in such a manner, the participants within the video conference may be notified that the team member is observing the video conference. Further, some examples may provide options to activate a microphone and camera as an implicit command to join the meeting. Thus, a team member may observe an on-going conference and, if they elect to join, may simply activate their microphone and camera to join the meeting and begin contributing. Such functionality may more closely resemble an in-person meeting in a conference room where team members passing by may notice the meeting and spontaneously decide to join. Alternatively, the participants in the meeting may note that the team member is observing meeting and may send a request to the team member to join the meeting.

Other status information may be provided as well. For example, each of the team members is represented within the virtual space 410 by a stylized portrait 420a-c along with a corresponding status indicator 422a-c. The status indicators may indicate the current status of the team members 420a-c. For example, team member 420c has a dark status indicator 422c, indicating that the team member 420c is offline. Team member 420b has a bright status indicator, indicating that they are online and active, while team member 420a has a dimmed status indicator, indicating that they are online, but inactive. Thus, a team member can easily determine whether other team members are available for collaboration. Similarly, documents or other resources may provide indications of whether one or more members of the space is accessing the document or resource. For example, document 430a is being accessed by two members of the virtual space 410 as illustrated by status indicators 432a-b. To gain more information about which members are accessing the document, a user may select one of the indicators 432a-b to obtain information about the corresponding member, such as the member's name. Still other status information may be provided according to other examples.

Figure 5:
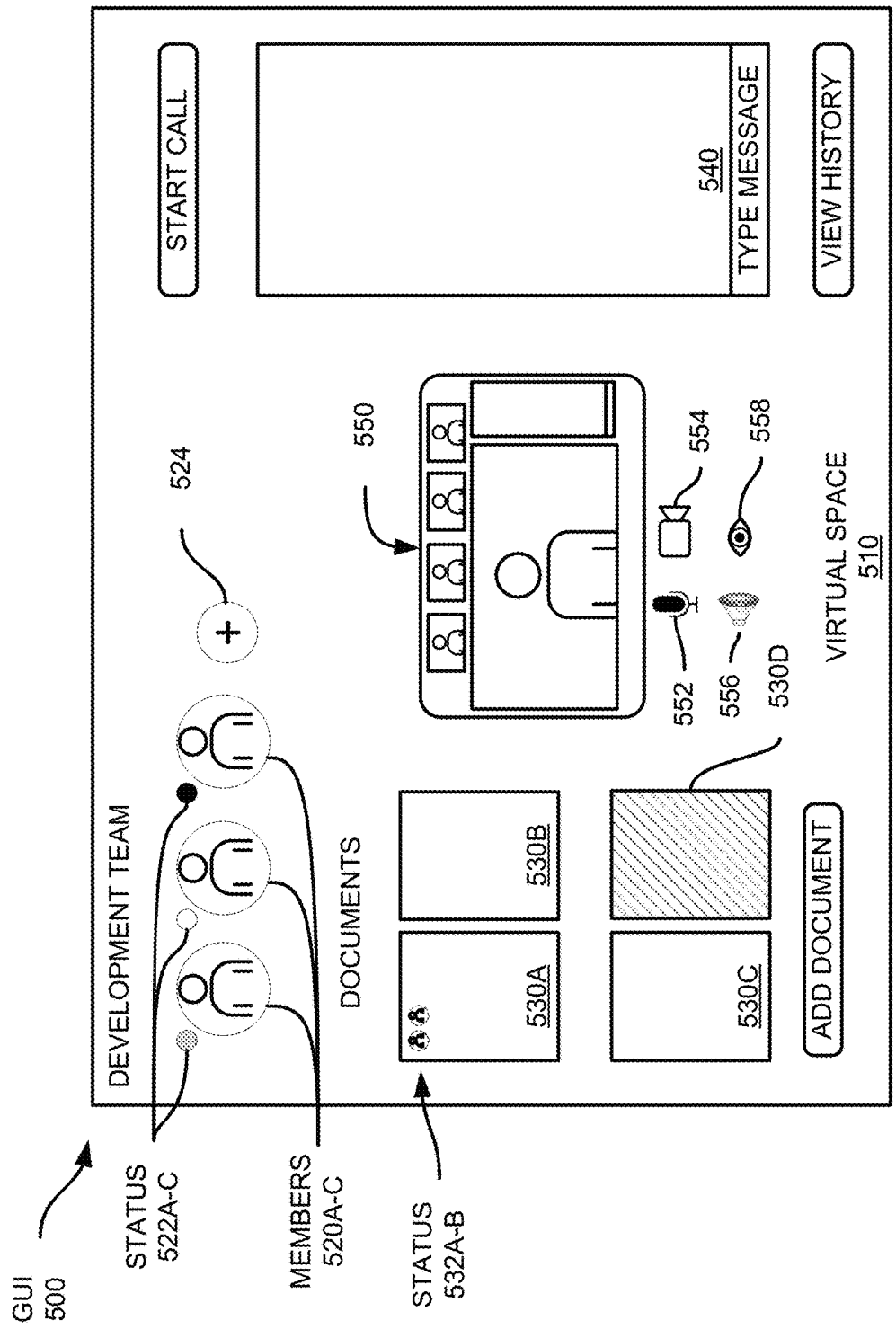

Referring now to FIG. 5, Figure shows another GUI 500 representation of a virtual space 510. The GUI 500 in this example includes many of the same features as those shown in FIG. 4, including multiple members 520a-c of the space and corresponding status indicators 522a-c, an option 524 to add members to the virtual space 510, multiple documents 530a-d and corresponding status indicators 532a-b, a chat window, and a representation of an on-going video conference 550. However, unlike the GUI 400 shown in FIG. 4, this representation of the virtual space 510 allows a user to seamlessly join the on-going video conference by selecting the options to activate a microphone 552 and activate a camera 554, or similarly may observe the conference by selecting the audio or eye icons 556, 558. Thus, the user may simply join the meeting by activating their input devices, or may only enable one or the other to speak without visually appearing in the video conference, or simply appear within the video conference without providing audio.

In addition to these differences, the virtual space 510 in this example has been configured to allow team members to apply permissions to different content within the virtual space 510. In this example, the user viewing the GUI 500 representation of the virtual space 500 is presented with four available documents 530a-d; however, document 530d has been shaded to indicate that the user does not have permission to view or otherwise access the document 530d. In some examples, however, if a team member does not have permission to access a document, the document may not be represented within their GUI 500 view of the virtual space 500, thus they may not be aware of its existence.

Figure 6:
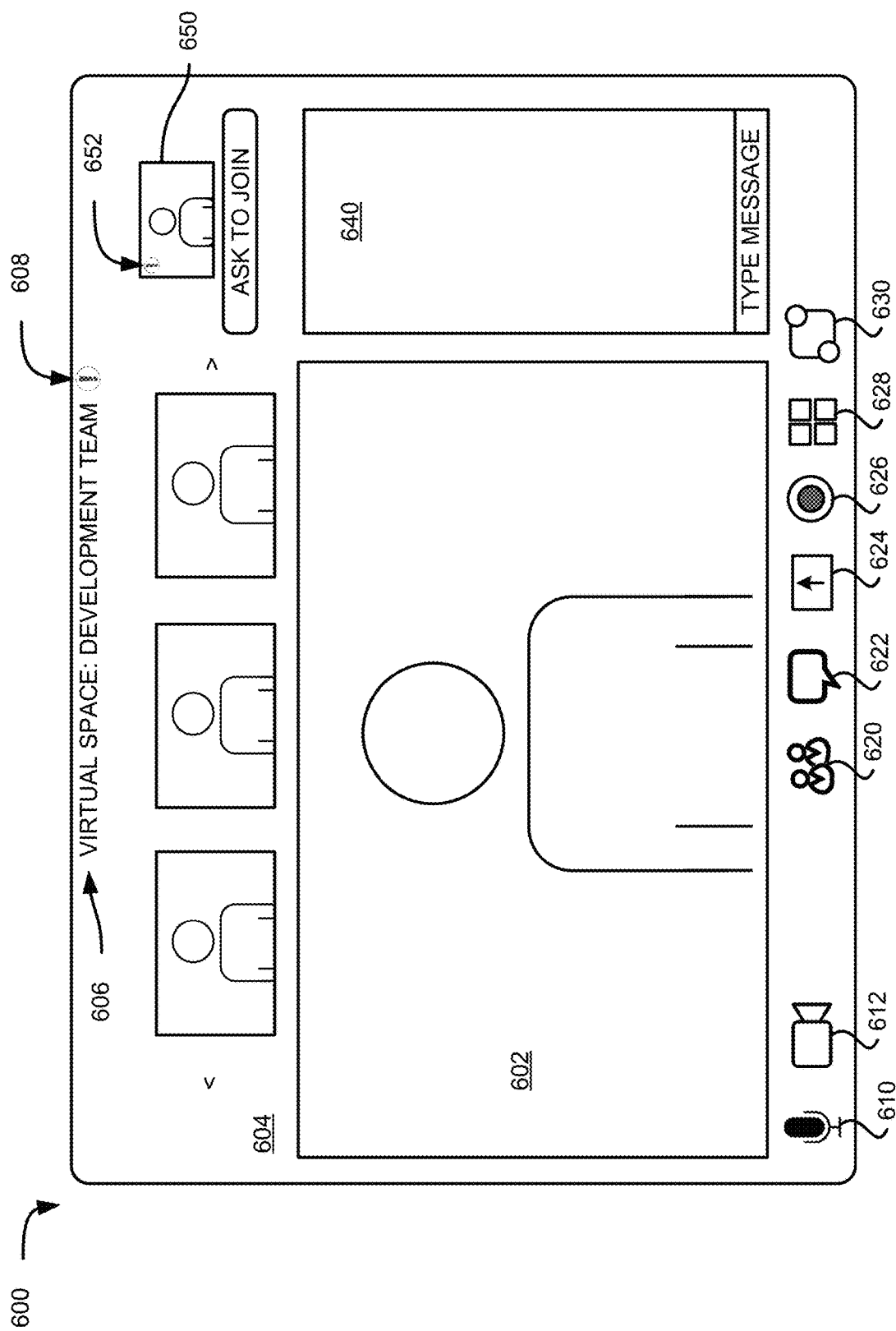

Referring now to FIG. 6, FIG. 6 shows an example GUI 600 presented to participants in a video conference that has been attached to a space. A client device, e.g., client device 330 or client devices 340a-n, executes video conferencing software, which in turn displays the GUI 600 on the client device's display. In this example, the GUI 600 includes a speaker view window 602 that presents the current speaker in the video conference. Above the speaker view window 602 are smaller participant windows 604, which allow the participant to view some of the other participants in the video conference, as well as controls ("<" and ">") to let the host scroll to view other participants in the video conference. On the right side of the GUI 600 is a chat window 640 within which the participants may exchange chat messages.

Beneath the speaker view window 602 are a number of interactive elements 610-630 to allow the participant to interact with the video conference software. Controls 610-612 may allow the participant to toggle on or off audio or video streams captured by a microphone or camera connected to the client device. Control 620 allows the participant to view any other participants in the video conference with the participant, while control 622 allows the participant to send text messages to other participants, whether to specific participants or to the entire meeting. Control 624 allows the participant to share content from their client device. Control 626 allows the participant toggle recording of the meeting, and control 628 allows the user to select an option to join a breakout room. Control 630 allows a user to launch an app within the video conferencing software, such as to access content to share with other participants in the video conference.

During the normal course of a video conference, the user interacts with the video conferencing application and other participants via the GUI 600. In addition, because the video conference has been attached to a space, e.g., spaces 410, 510, the GUI 600 identifies the virtual space that the video conference is attached to by providing a caption 606 at the top of the GUI. In addition, an indicator 608 is provided next to the caption 606 to indicate that the conference is being recorded. In some examples, virtual spaces may automatically record video conferences that are created from within the space or that are attached to the space to provide a record of the video conference if members of the space would like to review the meeting after it has ended.

In addition, because the GUI 600 is attached to a space, members of the space may be able to interact with the video conference without joining the video conference, as discussed above. For example, a member of the space may wish to listen into the meeting or access video to view documents or other content being displayed within the video conference. Thus, the member may observe the video conference without joining it. In some examples, the GUI 600 may provide an indication that a member of the space is observing the video conference by adding a stylized representation of the observing member 650 and include and indicator 652 to let other participants in the video conference that the member of the space is observing the video conference, but has not joined it. Further, the participants in the conference may select the "Ask to Join" option to ask the observer to join the conference.

Figure 7:
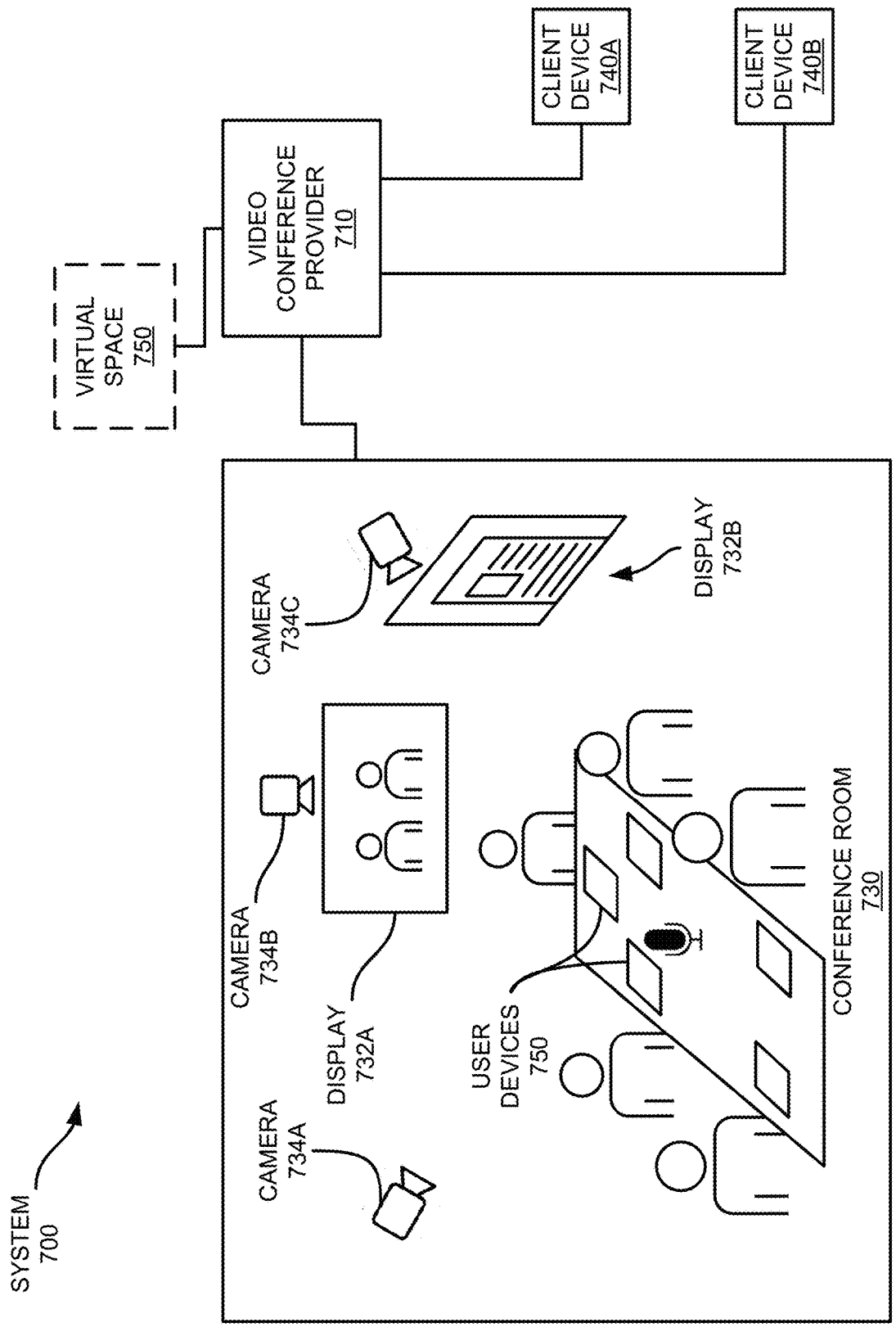
FIG. 7 shows an example system for providing persistent hybrid virtual collaborative workspaces.

Referring now to FIG. 7, FIG. 7 illustrates an example system 700 for providing persistent hybrid virtual spaces. The system 700 includes a video conference provider 710 that has established and is maintaining a virtual space 750. In addition, multiple client devices are connected to the video conference provider 710. One of the client devices includes video conferencing equipment installed within a physical conference room 730, while two additional client devices 740*a-b* are computing devices operated by users remote from the conference room 730, but that are connected to the virtual space 750. In this example, the video conference equipment in the conference room 730 includes two displays 732*a-b* and three cameras 734*a-c*. In addition, five user devices 750 are provided as a part of the video conferencing equipment, which are provided in addition to any user devices the attendees of the meeting may have brought with them. The user devices 750 are integrated into the video conferencing equipment to enable users in the conference room 730 to control different aspects of the video conferencing equipment, such as content presented on the displays 732*a-b* or positioning of one or more of the cameras 734*a-c*.

In this example, the conference room 730 has connected to the video conference provider 710 and has attached to the virtual space 750. In this example, the video conferencing equipment includes a computing device (not shown) that controls the cameras 734*a-c*, the displays 732*a-b*, and the microphone, which is positioned on the conference table, though multiple microphones may be employed in some examples. In addition, the computing device may receive instructions from the user device 750 as discussed above, such as to control the displays or the cameras, to access content within the virtual space 510, or to interact with one or more team members within the virtual space 510.

After connecting to the video conference provider 710, one of the users can select a virtual space 750 to connect to. Once the conference room 730 is connected to the virtual space 750, other members of the virtual space 750 may see that the conference room is attached, such as by being presented with a representation of a video conference, such as the example representations 450, 550 shown in FIGS. 4 and 5. Thus, other members of the virtual space 750 can see that the meeting is in-progress and can decide whether to observe or join remotely, such as users of client devices 740*a-b*. Further, while this example system 700 shows only one conference room 730 connected to the space, in some examples, multiple conference rooms may be connected to the same space in one or more video conferences.

After the meeting has concluded, the participants in the conference room 730 can disconnect from the space, at which time the meeting and a corresponding representation within a GUI may be removed from the virtual space. However, in some examples, a conference room 730 may remain attached after the participants have concluded a meeting, and thus the video conference may persist along with a representation of the meeting within the space. In one such an example, other members of the space may view the conference room from within the space and interact with it, such as by observing one or more video feeds from the conference room, such as to review information posted on whiteboards or other physical objects within the conference room 730, such as a pinboard. Thus, the physical conference room may become an extension of the virtual space where remote participants can still interact with the conference room, even outside of the context of an active video conference.

Figure 8:
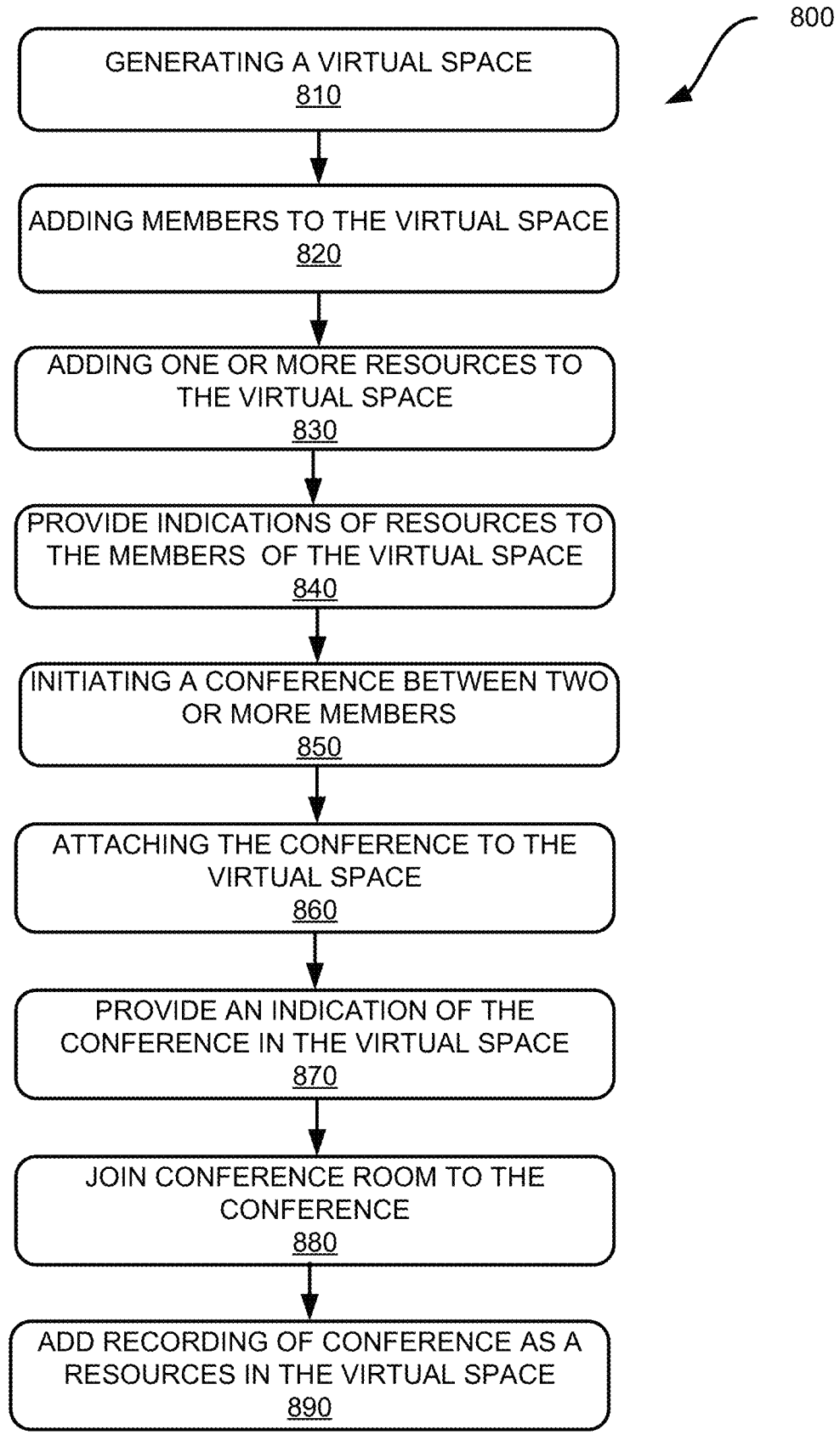
FIGS. 8-9 show example methods for providing persistent hybrid virtual collaborative workspaces.

Referring now to FIG. 8, FIG. 8 shows an example method 800 for providing persistent hybrid virtual collaborative workspaces. This example method 800 will be described with respect to the system 700 shown in FIG. 7 and the example GUIs 400-600 shown in FIGS. 4-6; however, any suitable systems or GUIs according to this disclosure may be employed, such as the systems of FIGS. 1-3.

At block 810, the video conference provider 710 generates a virtual space 750. In this example, a user logs into an account provided by the video conference provider 710, such as by providing a username and password. Once the user has logged in, they can select an option to create a new virtual space 750. When selecting the option, they may be presented with options, such as to provide a name for the virtual space 750. They may also be presented with options to add users to the space as members of the virtual space 750 or resources to the virtual space 750.

When creating the virtual space 750, the video conference provider 710 establishes one or more records in a data store corresponding to the virtual space 750. In addition, it may include references to user accounts or resources that have been added to the virtual space 750 based on the options selected by the user.

After the virtual space 750 is generated, the user is established as the "host" of the virtual space 750 and is provided with administrative privileges to add new users or resources or to change the configuration of the virtual space 750. The host may also designate other members as co-hosts, who may be granted similar administrative privileges.

At block 820, the video conference provider 710 adds one or more members to the virtual space 750. As discussed above, the video conference provider 710 may add members to the space as a part of generating the virtual space 750, based on one or more identified users received from the user creating the virtual space 750. However, in some examples users may be added to the virtual space 750 as members based on a member of the virtual space 750 selecting an option 424, 524 to add one or more new members.

At block 830, the video conference provider 710 adds one or more resources to the virtual space 850. Any suitable type of resource may be added to the virtual space, including documents, videos, audio, conference recordings or transcripts, or chat histories. As discussed above with respect to FIGS. 4 and 5, a member of a virtual space may select an option provided in a GUI to add a document or other resource. In some examples, resources may be added automatically by the video conference provider. For example, if members of the virtual space 750 participate in a conference via the virtual space 750, the virtual space 750 may automatically record the conference and store the recording as a resource available within the virtual space 740. Further, if the video conference provider 710 generates a transcript from the recording, the transcript may be added to the virtual space 750 as a resource.

A resource that has been added to a virtual space 750 may be accessible by other members within the virtual space 750. For example, resources within a virtual space 750 may be viewed within a GUI representation of the virtual space, such documents 430*a-d*, 530*a-d* as shown in FIGS. 4 and 5.

The process of adding a resource to the virtual space 750 may enable all members of the virtual space 750 to access any resource within the space 750. However, in some examples, members may apply permissions to different resources to restrict access to specific resources. For example, in the example GUI 500 shown in FIG. 5, document 530*d* has been restricted to only some members of the virtual space 750. Permissions may be desirable for documents that are relevant to one portion of a team, but not to others. For example, a development team may have many different members with different responsibilities. Engineers in the space may be granted access to technical documents, such as specifications and design documents, while project leads may also have access to financial documents, such as budgets or cost information that is not available to the engineers. As discussed above, depending on the configuration for a virtual space, resources inaccessible to a particular member may not be displayed within that member's GUI view of the virtual space, or the inaccessible resources may be visible, but presented in a way to indicate that they are not accessible, such as by shading the resource or placing a closed padlock icon overlaid on the resource. However, while access levels may be applied to different resources, these may be changed at any suitable time by an authorized member of the space 750 or by an administrator.

At block 840, the video conference provider 710 provides an indication about resources available within the virtual space 750 to members connected to the virtual space 750. For example, a member may access the virtual space 750 via a GUI 400, 500 and view available resources within the GUI 400, 500. To enable the GUI 400, 500 to provide such indications of the available resources, the video conference provider 710 may transmit information identifying available resources. Based on the received information, the GUI 400, 500 may present some or all of the available resources, such as shown in FIGS. 4 and 5. Based on whether a particular member has access to a particular resource, the video conference provider 710 may provide information indicating whether the member has access to one or more resources, which may affect how the resources are displayed within a GUI 400, 500. For example, as discussed above, if a user does not have access to a particular resource, it may be displayed differently from resources to which the user does have access.

It should be appreciated that updates to the virtual space 750 may occur in real-time or near-real-time as resources are added or removed from the virtual space 750. Thus, if a member adds a new document to the virtual space 750, the video conference provider 710 may add the resource to the virtual space 750 and may then asynchronously send an indication to members that are connected to the space, e.g., they are viewing the virtual space via a GUI 400, 500, which may cause the respective GUIs 400, 500 to then display a representation of the newly added resource. Similarly, if a resource is removed from the space or has its access rights changed, such changes may be updated by the video conference provider 710 and propagated to any connected members, which may affect the display of the virtual space within a corresponding GUI 400, 500.

At block 850, the video conference provider 710 initiates a conference between two or more members of the virtual space 750. As discussed above, a GUI 400, 500 presenting a view of a virtual space may provide the option to start a call with another member or members of the virtual space. If a member selects the option to start a call, they may select one or more other members to call and, if the selected member(s) accept the call, the video conference provider 710 establishes a new conference and joins the members to the conference, such as discussed above with respect to FIGS. 1 and 2. During the call, the participants may exchange audio and video streams, or other content, to interact during the call.

At block 860, the video conference provider 710 attaches the conference to the virtual space 750. In this example, the video conference provider 710 attaches the conference by adding a resource to the virtual space 750 for the conference, which includes information about the conference, such as a meeting identifier and passcode. In some examples, the resource may include a URL to access the conference. When the conference is attached to the virtual space 750, information about the conference may be provided to any members connected to the space. A GUI 400, 500 may then present a representation of the conference 450, 550 so that the member can see the conference and decide whether to interact with it.

At block 870, the video conference provider 710 provides an indication of the conference to one or more members connected to the virtual space 750. As discussed above, the representation of the conference 450, 550 may be a static, stylized representation of a conference, such as by showing a graphic similar to that shown in FIGS. 4 and 5. However, in some examples, the representation of the conference 450, 550 may display dynamic content from the conference, such as views of video streams or content displayed within the conference. To enable such functionality, the video conference provider 710 may provide both an indication of the conference to the members connected to the virtual space 750 as well as information about one or more video feeds within the conference. The GUI 400, 500 may then access to video feeds and present one or more of the feeds within the representation of the conference 450, 550. Presenting such a live view of the conference may cause participants within the conference to be notified about other members observing the conference, such as discussed above with respect to FIG. 6.

At block 880, the video conference provider 710 receives a request from a conference room 730 to join the conference, and in response, the video conference provider 710 joins the conference room to the conference 730. In this example, the request from the conference room 730 includes an identification of at least one member of the virtual space who is present within the conference room 730. However, in some examples, the conference room 730 may be a member of the virtual space, or may be attached to the virtual space 750. Thus, the request may not identify any other member of the virtual space 750. In some examples, the request to join the conference may be a request to create or establish a new conference. In response to receive of such a request, the video conference provider 710 may establish a new conference and join the conference room 730 to the conference. It may then provide an indication of the conference in the virtual space, generally as described above with respect to block 870.

At block 890, the video conference provider 710 adds a recording of the conference to the virtual space 710. In this example, conferences initiated within a virtual space 750 are automatically recorded by the video conference provider 710, though the participants can override such functionality. After the conference has ended, the video conference provider 710 stores the recording and adds the recording as a resource within the virtual space 750. In some examples, the video conference provider 710 may provide access to any members of the virtual space 750, though in some examples, it may only provide access to a subset of the members, such as the members who participated in the conference. The recording may then be accessed via the virtual space.

In some examples, a conference may be established based on a conference room 730 being attached to the virtual space, even if no members of the virtual space 710 are active in the space or present in the conference room. Instead, the conference may be attached and idle. In some such cases, the video conference provider 310 may not record the conference while it remains idle or while no members of the virtual space, other than the conference room 730, are present within the conference.

The description of the example method 800 provides a particular ordering of functionality for purposes of illustration. However, it should be appreciated that virtual spaces are dynamic and operate asynchronously. Thus, as members interact with the virtual space 750 to add resources, interact with resources, and interact with other members, the state of the virtual space changes based on those interactions. And since the interactions may be driven by user selections or occur in response to user inputs, they may occur in any suitable ordering or any number of times. Thus, the method 800 illustrates functionality available within the space according to one example sequence of interactions with the virtual space 750. In some examples, various steps may be performed in different orders or may be omitted.

Figure 9:
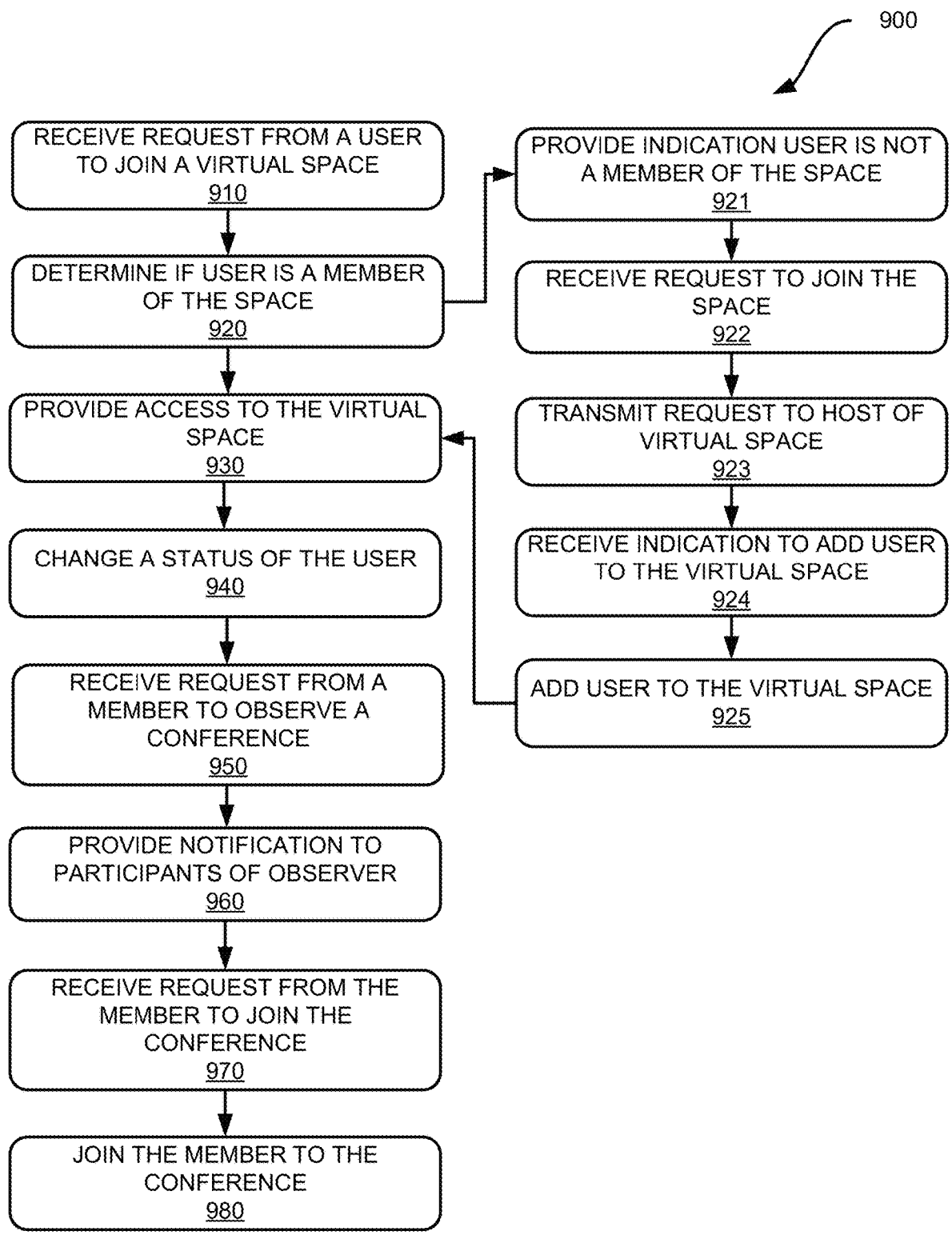

Referring now to FIG. 9, FIG. 9 shows another method 900 for providing persistent hybrid virtual collaborative workspaces. The example method 900 will be described with respect to the system shown in FIG. 7 and the GUIs 400-600 shown in FIGS. 4-6; however, any suitable systems or GUIs according to this disclosure may be employed, such as the systems of FIGS. 1-3

At block 910, the video conference provider 710 receives a request from a user to join a virtual space 750. For example, a user may access a video conferencing application executing on their client device, e.g., client device 740a-b, 750, and select the virtual space 750 from one or more available virtual spaces. The request may then include information about the user, such as a username, an email address, or an employee identifier. If the user has not logged into an account with the video conference provider 710 or otherwise established a verified identity, such as via a user identity provider 115, 215, the video conference provider 710 may transit a request that the user log into a suitable account to verify their identity.

At block 920, the video conference provider 710 determines whether the user is a member of the virtual space 750. For example, the video conference provider 710 may access a list of members of the virtual space 750 within a data store and attempt to locate a member corresponding to the user, such as based on their account with the video conference provider or identity provided by the user identity provider 115, 215.

If the user is determined to be a member of the virtual space 750, the method proceed to block 930. Otherwise, it proceeds to block 921.

At block 921, the video conference provider 710 provides an indication to the user that they are not a member of the virtual space 750, such as by sending a message to the user's client device, which may then display a message or other indication to the user.

At block 922, the video conference provider 710 may receive a request from the user to join the virtual space 750. It should be appreciated that if the user does not request to join the virtual space 750, the method 700 terminates.

At block 923, the video conference provider 710 transmits a request to the host or a co-host of the virtual space 750. In some examples, the video conference provider 710 transmits a request to all hosts and co-hosts, or only to those who are active within the virtual space 750 at the time.

At block 924, the video conference provider 710 receives an indication from the host or a co-host to add the user to the virtual space 750. If the video conference provider 710 does not receive the indication, or receives an indication denying the request, the method 700 may terminate, or the video conference provider 710 may re-transmit the request to the host or co-host.

At block 925, the video conference provider 925 adds the user to the virtual space, generally as described above with respect to block 820.

At block 930, the video conference provider 710 provides access to the virtual space 750 to the user. For example, the video conference provider 710 may provide indications of one or more other members of the virtual space 750, one or more available resources, one or more conferences in-progress, or chat message activity. The user's client device may receive the indications and generate a GUI 400, 500 including representations of some or all of these parts of the virtual space 750.

At block 940, the video conference provider 710 changes the status of the user within the virtual space 750. For example, if the user had previously been a member of the space, the video conference provider 710 may change the status of the user from "offline" to "active" or "online." If the user was not previously a member, the video conference provider 710 may establish the user's status as "active" or "online." The video conference provider 710 may then propagate that status to other members of the virtual space 750.

At block 950, the video conference provider 710 receives a request from a member of the virtual space 750 to observe a conference. For example, the user may select the "Observe Call" button shown in FIG. 4 or 5. A member may observe a conference to view video feeds and hear audio feeds exchanged within the conference, but without actually joining the conference, which prevents them from interacting with the participants via the conference. A user may wish to observe the call to see what is being discussed without interrupting the members within the conference.

At block 960, the video conference provider 710 provides a notification to the participants within the conference that the member is observing the conference. Such a notification may be presented to the participants within their respective GUIs, such as illustrated in FIG. 6.

At block 970, the video conference provider 710 receives a request from the member to join the conference. For example, the member may select the "Join Call" button shown in FIG. 4 or may simply select the representation of the conference 530 in a GUI 500 and then unmute their microphone and activate their camera to seamlessly join the conference. Upon receiving an indication that the user has selected the conference and unmuted their microphone or activated their camera, the video conference provider 710 interprets such actions as an implicit request to join the conference.

At block 980, the video conference provider 710 joins the member to the conference. If the conference is configured such that the host must approve new participants, the member will be joined to the conference and may begin interacting within the conference as a participant. However, if the conference requires the host or a co-host to approve new participants, the video conference provider 710 may notify the host or co-host that a new participant wishes to join and, if the host or co-host approves the participant to join, the video conference provider 710 joins the member to the conference as a participant, generally as described above with respect to FIGS. 1-2.

This example method 900 employs a certain sequence of actions to illustrate certain functionality offered by a virtual space 750 maintained by a video conference provider 710. However, it should be appreciated that such functionality may occur asynchronously in any order based on received interactions from various members of the virtual space 750 or users attempting to access the virtual space 750. Thus, other sequences may be used according to other examples.

Figure 10:
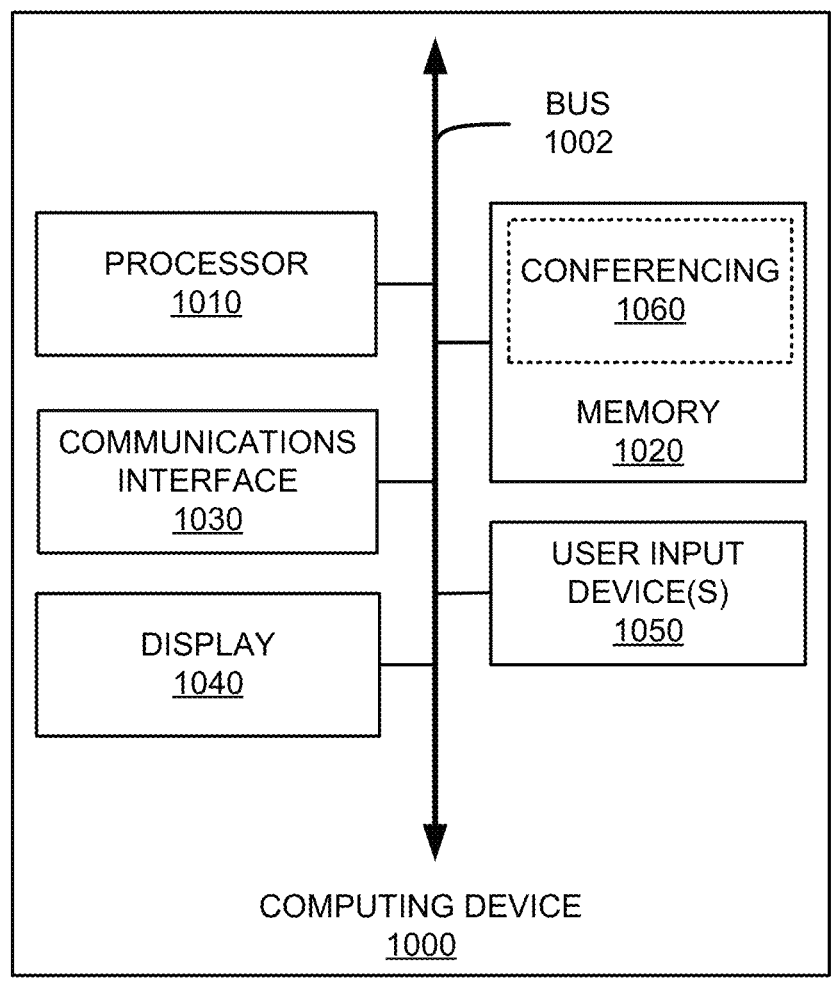
FIG. 10 shows an example computing device suitable for use with various systems and methods for persistent hybrid virtual collaborative workspaces.

Referring now to FIG. 10, FIG. 10 shows an example computing device 1000 suitable for use in example systems or methods for persistent hybrid virtual collaborative workspaces according to this disclosure. The example computing device 1000 includes a processor 1010 which is in communication with the memory 1020 and other components of the computing device 1000 using one or more communications buses 1002. The processor 1010 is configured to execute processor-executable instructions stored in the memory 1020 to perform one or more methods for persistent hybrid virtual collaborative workspaces according to different examples, such as part or all of the example methods 800, 900 described above with respect to FIGS. 8 and 9. The computing device 1000, in this example, also includes one or more user input devices 1050, such as a keyboard, mouse, touchscreen, microphone, etc., to accept user input. The computing device 1000 also includes a display 1040 to provide visual output to a user.

In addition, the computing device 1000 includes a video conferencing application 1060 to enable a user to join and participate in one or more virtual spaces or in one or more conferences, such as a conventional conference or webinar, by receiving multimedia streams from a video conference provider, sending multimedia streams to the video conference provider, joining and leaving breakout rooms, creating video conference expos, etc., such as described throughout this disclosure, etc.

The computing device 1000 also includes a communications interface 1040. In some examples, the communications interface 1030 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
    generating, by a conference provider, a virtual space, the virtual space persistent independently of any members being present within the virtual space;
    adding a plurality of members to the virtual space, each member representing a discrete entity;
    adding one or more resources to the virtual space in response to one or more inputs from one or more of the members;
    adding a physical video conference room to the virtual space as a member of the virtual space to enable the physical video conference room to access to the one or more resources within the virtual space and be accessible by other members of the virtual space;
    receiving from the virtual space a request from a first member of the virtual space to initiate a conference with a second member of the virtual space, wherein the first or second member is the physical video conference room;
    in response to the request, initiating, by the conference provider, the conference between the first and second members;
    attaching the conference to the virtual space; and
    providing an indication of the conference in the virtual space.

2. The method of claim 1, further comprising:
    receiving, from a first member of the plurality of members, a first document;
    associating the first document with the virtual space; and
    providing an indication to other members of the plurality of members of the first document being added to the virtual space.

3. The method of claim 2, further comprising:
    receiving, from the first member, a permission level associated with the first document; and
    wherein:
        associating the first document with the virtual space comprises applying the permission level to the first document; and
        providing the indication to the other members of the plurality of members is based on the permission level.

4. The method of claim 1, further comprising:
    recording the conference; and
    after the conference ends, adding the recording to the virtual space.

5. The method of claim 1, further comprising:
    receiving a chat input from a first members; and
    providing the chat input to the other members within the virtual space.

6. The method of claim 1, wherein the virtual space is a first virtual space, and further comprising:
    generating, by the conference provider, a second virtual space; and
    adding second members to the second virtual space, at least one second member being a member in the first virtual space.

7. The method of claim 1, further comprising:
    receiving a request to join a conference from the physical video conference room, the conference attached to the virtual space; and
    joining the physical video conference room to the conference.

8. A system comprising:
    a communications interface;
    a non-transitory computer-readable medium; and
    one or more processors communicatively coupled to the non-transitory computer-readable medium, the one or more processors configured to execute processor-executable instructions stored in the non-transitory computer-readable medium to:
        generate a virtual space, the virtual space persistent independently of any members being present within the virtual space;
        add a plurality of members to the virtual space, each member representing a discrete entity;
        add one or more resources to the virtual space in response to one or more inputs from one or more of the members;
        add a physical video conference room to the virtual space as a member of the virtual space to enable the physical video conference room to access to the one or more resources within the virtual space and be accessible by other members of the virtual space;
        receive, from the virtual space, a request from a first member of the virtual space to initiate a conference with a second member of the virtual space, wherein the first or second member is the physical video conference room;
        in response to the request, initiate the conference between the first and second members;
        attach the conference to the virtual space; and
        provide an indication of the conference in the virtual space.

9. The system of claim 8, wherein the one or more processors are configured to execute further processor-executable instructions stored in the non-transitory computer-readable medium to:
    receive, from a first member of the plurality of members, a first document;
    associate the first document with the virtual space; and
    provide an indication to other members of the plurality of members of the first document being added to the virtual space.

10. The system of claim 9, wherein the one or more processors are configured to execute further processor-executable instructions stored in the non-transitory computer-readable medium to:
    receive, from the first member, a permission level associated with the first document;
    apply the permission level to the first document; and
    provide the indication to the other members of the plurality of members based on the permission level.

11. The system of claim 8, wherein the one or more processors are configured to execute further processor-executable instructions stored in the non-transitory computer-readable medium to:
record the conference; and
after the conference ends, add the recording to the virtual space.

12. The system of claim 8, wherein the one or more processors are configured to execute further processor-executable instructions stored in the non-transitory computer-readable medium to:
receive a chat input from a first members; and
provide the chat input to the other members within the virtual space.

13. The system of claim 8, wherein the virtual space is a first virtual space, and wherein the one or more processors are configured to execute further processor-executable instructions stored in the non-transitory computer-readable medium to:
generate a second virtual space; and
add second members to the second virtual space, at least one second member being a member in the first virtual space.

14. The system of claim 8, wherein the virtual space is a first virtual space, and wherein the one or more processors are configured to execute further processor-executable instructions stored in the non-transitory computer-readable medium to:
receive a request to join a conference from the physical video conference room, the conference attached to the virtual space; and
join the physical video conference room to the conference.

15. A non-transitory computer-readable medium comprising processor-executable instructions configured to cause one or more processors to:
generate a virtual space, the virtual space persistent independently of any members being present within the virtual space;
add a plurality of members to the virtual space, each member representing a discrete entity;
add one or more resources to the virtual space in response to one or more inputs from one or more of the members;
add a physical video conference room to the virtual space as a member of the virtual space to enable the physical video conference room to access to the one or more resources within the virtual space and be accessible by other members of the virtual space;
receive, from the virtual space, a request from a first member of the virtual space to initiate a conference with a second member of the virtual space, wherein the first or second member is the physical video conference room;
in response to the request, initiate the conference between the first and second members;
attach the conference to the virtual space; and
provide an indication of the conference in the virtual space.

16. The non-transitory computer-readable medium of claim 15, further comprising processor-executable instructions configured to cause the one or more processors to:
receive, from a first member of the plurality of members, a first document;
associate the first document with the virtual space; and
provide an indication to other members of the plurality of members of the first document being added to the virtual space.

17. The non-transitory computer-readable medium of claim 16, further comprising processor-executable instructions configured to cause the one or more processors to:
receive, from the first member, a permission level associated with the first document; and
apply the permission level to the first document; and
provide the indication to the other members of the plurality of members based on the permission level.

18. The non-transitory computer-readable medium of claim 15, further comprising processor-executable instructions configured to cause the one or more processors to:
record the conference; and
after the conference ends, add the recording to the virtual space.

19. The non-transitory computer-readable medium of claim 15, further comprising processor-executable instructions configured to:
receive a chat input from a first members; and
provide the chat input to the other members within the virtual space.

20. The non-transitory computer-readable medium of claim 15, wherein the virtual space is a first virtual space, and further comprising processor-executable instructions configured to cause the one or more processors to:
generate a second virtual space; and
add second members to the second virtual space, at least one second member being a member in the first virtual space.

* * * * *